(12) United States Patent
Johnson (10) Patent No.: US 11,750,825 B2
(45) Date of Patent: Sep. 5, 2023

(54) METHODS, APPARATUSES, COMPUTER PROGRAMS AND COMPUTER-READABLE MEDIA FOR PROCESSING CONFIGURATION DATA

(71) Applicant: V-NOVA INTERNATIONAL LIMITED, London (GB)

(72) Inventor: Robert Johnson, London (GB)

(73) Assignee: V-NOVA INTERNATIONAL LIMITED

( * ) Notice: Subject to any disclaimer, the term of this patent is extended or adjusted under 35 U.S.C. 154(b) by 0 days.

(21) Appl. No.: 17/290,469

(22) PCT Filed: Oct. 30, 2019

(86) PCT No.: PCT/GB2019/053066
§ 371 (c)(1),
(2) Date: Apr. 30, 2021

(87) PCT Pub. No.: WO2020/089614
PCT Pub. Date: May 7, 2020

(65) Prior Publication Data
US 2021/0377550 A1    Dec. 2, 2021

(30) Foreign Application Priority Data

Oct. 31, 2018   (GB) ..................... 1817780

(51) Int. Cl.
*H04N 19/33* (2014.01)
*H04N 19/124* (2014.01)

(52) U.S. Cl.
CPC ........... *H04N 19/33* (2014.11); *H04N 19/124* (2014.11)

(58) Field of Classification Search
CPC .... H04N 19/33; H04N 19/124; H04N 19/463; H04N 19/70; H04N 19/30
See application file for complete search history.

(56) References Cited

U.S. PATENT DOCUMENTS 5,812,760 A * 9/1998 Mendenhall ......... H04N 21/236
  348/467
2004/0133750 A1* 7/2004 Stewart ................... G06F 7/575
  711/148

(Continued)

FOREIGN PATENT DOCUMENTS

WO   2018-046940   3/2018

OTHER PUBLICATIONS

Anonymous, "Scalable HEVC Encoding: how to setup cfg files for quality scalability?—stack overflow", Jun. 26, 2017, XP055660374, retrieved from the internet, URL: https://stackoverflow.com/questions/44203320/scalable-hevc-encoding-how-to-setup-cfg-files-for-quality-scalability [retrieved on Jan. 21, 2020].

(Continued)

*Primary Examiner* — Joseph Suh
(74) *Attorney, Agent, or Firm* — WORKMAN NYDEGGER (57) ABSTRACT

For each image in a set of images, residual data is obtained based on first and second representations of the image at a first level of quality. The second representation is based on a representation of the image at a second, lower level of quality. The residual data is useable by a decoder to reconstruct, for each image in the set, the first representation using the second representation. One or more configuration parameters of configuration data relating to processing of the residual data: (i) are obtained, (ii) are useable by the decoder to reconstruct the first representation for each image in the set, and (iii) correspond to multiple images in the set. The one or more configuration parameters are output for processing by the decoder. The number of times the one or more configuration parameters is output for the set is less than the number of images in the set.

18 Claims, 7 Drawing Sheets

(56) References Cited

U.S. PATENT DOCUMENTS

| | | | |
|---|---|---|---|
| 2008/0204217 A1* | 8/2008 | Costello | B60C 23/0464 |
| | | | 340/447 |
| 2013/0294495 A1 | 11/2013 | Rossato et al. | |
| 2014/0108704 A1* | 4/2014 | Boring | G06F 8/654 |
| | | | 711/103 |
| 2015/0156517 A1* | 6/2015 | Lu | H04N 19/635 |
| | | | 375/240.18 |
| 2016/0358100 A1* | 12/2016 | Natroshvili | G06N 20/00 |
| 2016/0380851 A1* | 12/2016 | Kosai | G06F 3/04845 |
| | | | 715/735 |
| 2017/0155906 A1* | 6/2017 | Puri | H04N 19/122 |
| 2017/0308996 A1* | 10/2017 | Kadu | G06T 5/002 |
| 2018/0376153 A1* | 12/2018 | Gokhale | H04N 19/147 |
| 2019/0068981 A1* | 2/2019 | Chong | H04N 19/184 |
| 2019/0104314 A1* | 4/2019 | Yonezawa | H04N 19/14 |

OTHER PUBLICATIONS

International Search Report and Written Opinion for PCT/GB2019/053066 dated Jun. 30, 2020.

Rosewarne et al., "High Efficiency Video Coding (HEVC) Test Model 16 (HM 16) Update 2 of Encoder Description", 20, JCT-VC Meeting; Feb. 10, 2015 to Feb. 18, 2015, Geneva, Joint Collaborative Team on Video Coding of ISO/IEC JTC1/SC29/WG11 and ITU-T SG.16), URL: http://wftp3.itu.int/av-arch/jctvc-site/, No. JCTVC-T1002, Jun. 2, 2015, XP030117409.

* cited by examiner

METHODS, APPARATUSES, COMPUTER PROGRAMS AND COMPUTER-READABLE MEDIA FOR PROCESSING CONFIGURATION DATA

CROSS-REFERENCE TO RELATED APPLICATIONS

The present application is a 371 US Nationalization of International Application No. PCT/GB2019/053066, filed Oct. 30, 2019, which claims priority to United Kingdom Patent Application No. 1817780.8, filed Oct. 31, 2018, the disclosures of which are hereby incorporated by reference herein in their entirety.

TECHNICAL FIELD

This invention relates to methods, apparatuses, computer programs and computer-readable media. In particular, but not exclusively, this invention relates to methods, apparatuses, computer programs and computer-readable media for use in the processing of configuration information that relates to residual data useable in image reconstruction.

BACKGROUND

Compression and decompression of signals is a consideration in many known systems. Many types of signal, for example video, audio or volumetric signals, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the amount of information that is stored, used and/or transmitted. The amount of information may vary, for example depending on the desired level of quality of the reconstructed signal, the nature of the information that is used in the reconstruction, and/or how such information is configured. Another consideration is the ability of the decoder to reconstruct the signal accurately and/or reliably. One factor in the accuracy and/or the reliability with which the decoder is able to perform reconstruction relates to providing the decoder with up-to-date information indicating how the signal is to be reconstructed.

SUMMARY

Various aspects of the present invention are set out in the appended claims. Further features and advantages will become apparent from the following description of preferred embodiments, given by way of example only, which is made with reference to the accompanying drawings.

DETAILED DESCRIPTION

Figure 1:
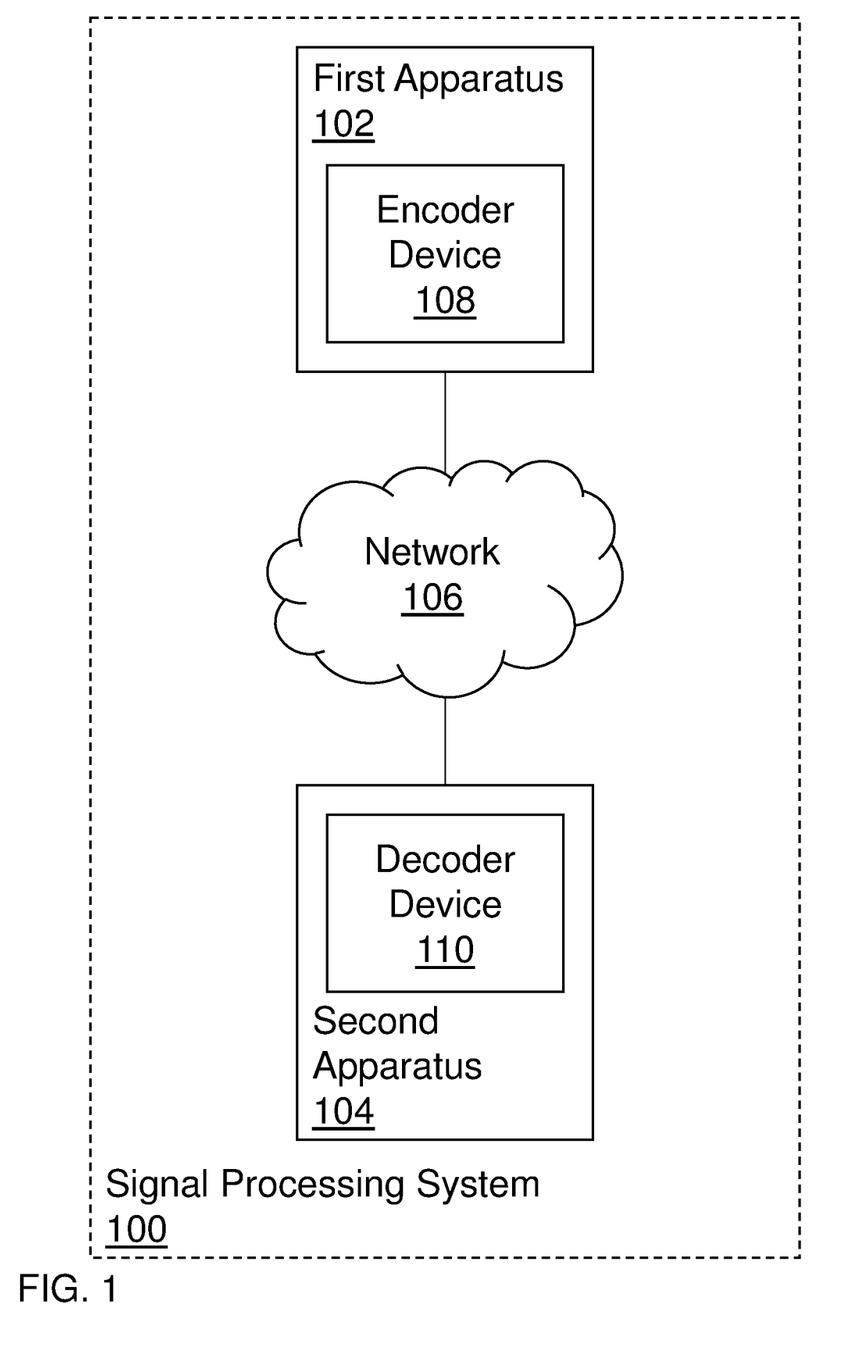
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The one or more components may be implemented in hardware and/or software. The one or more components may be co-located or may be located remotely from each other in the signal processing system 100. Examples of types of apparatus include, but are not limited to, computerised devices, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder 108. The encoder 108 is configured to encode data comprised in the signal, which is referred to hereinafter as "signal data". For example, where the signal is a video signal, the encoder 108 is configured to encode video data. Video data comprises a sequence of multiple images or frames. The encoder 108 may perform one or more further functions in addition to encoding signal data. The encoder 108 may be embodied in various different ways. For example, the encoder 108 may be embodied in hardware and/or software.

Although in this example the first apparatus 102 comprises the encoder 108, in other examples the first apparatus 102 is separate from the encoder 108. In such examples, the first apparatus 102 is communicatively coupled to the encoder 108. The first apparatus 102 may be embodied as one or more software functions and/or hardware modules.

The second apparatus 104 comprises a decoder 110. The decoder 110 is configured to decode signal data. The decoder 110 may perform one or more further functions in addition to decoding signal data. The decoder 110 may be embodied in various different ways. For example, the decoder 110 may be embodied in hardware and/or software.

Although in this example the second apparatus 104 comprises the decoder 110, in other examples, the second apparatus 104 is separate from the decoder 110. In such examples, the second apparatus 104 is communicatively coupled to the decoder 110. The second apparatus 104 may be embodied as one or more software functions and/or hardware modules.

The encoder 108 encodes signal data and transmits the encoded signal data to the decoder 110 via the data communications network 106. The decoder 110 decodes the received, encoded signal data and generates decoded signal data. The decoder 110 may output the decoded signal data, or data derived using the decoded signal data. For example, the decoder 110 may output such data for display on one or more display devices associated with the second apparatus 104.

In some examples described herein, the encoder 108 transmits to the decoder 110 a representation of a signal at a given level of quality and information the decoder 110 can use to reconstruct a representation of the signal at one or more higher levels of quality. Such information may be referred to as "reconstruction data". In some examples, "reconstruction" of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder 108 and transmitted to the decoder 110. For example, the reconstruction data may be in the form of metadata. In some examples, the reconstruction data is encoded and transmitted separately from the signal data.

The information the decoder 110 uses to reconstruct the representation of the signal at the one or more higher levels of quality may comprise residual data, as described in more detail below. Residual data is an example of reconstruction data. The information the decoder 110 uses to reconstruct the representation of the signal at the one or more higher levels of quality may also comprise configuration data relating to processing of the residual data. The configuration data may indicate how the residual data has been processed by the encoder 108 and/or how the residual data is to be processed by the decoder 110. The configuration data may be signaled to the decoder 110, for example in the form of metadata.

Figure 2A:
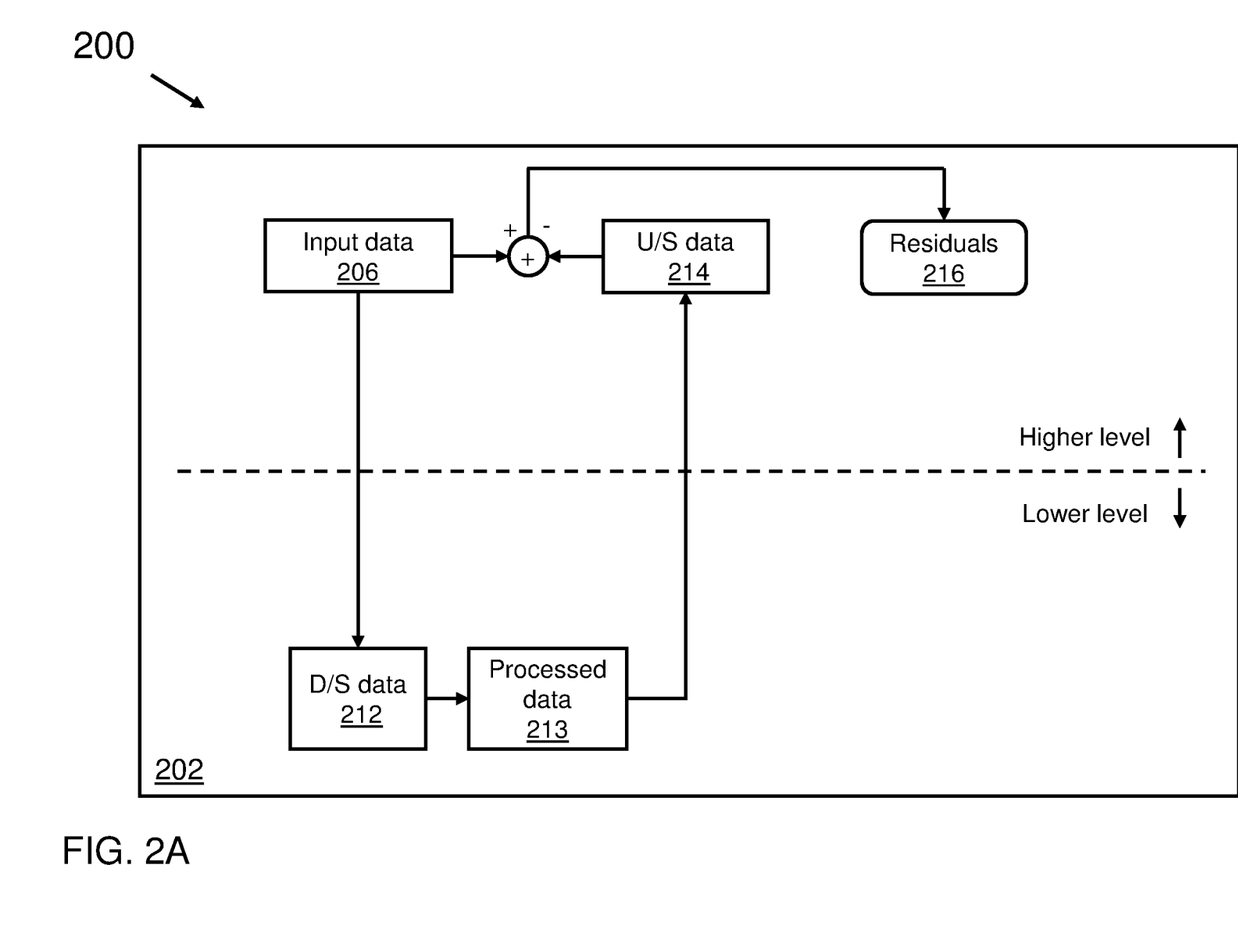
FIGS. 2A and 2B show a schematic block diagram of another example of a signal processing system in accordance with an embodiment of the present invention.
Figure 2B:
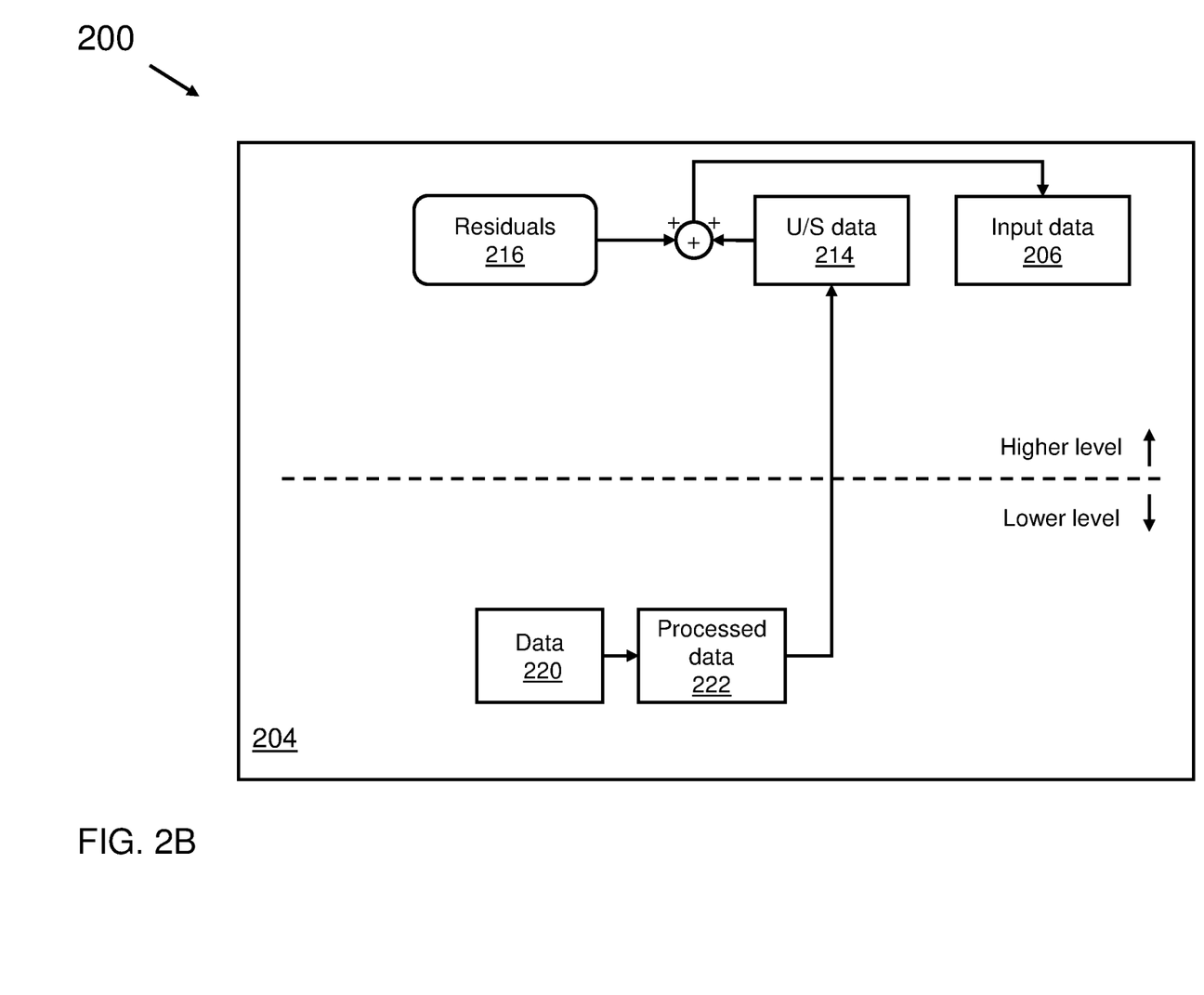

Referring to FIGS. 2A and 2B, there is shown schematically an example of a signal processing system 200. The signal processing system 200 includes a first apparatus 202 comprising an encoder and a second apparatus 204 comprising a decoder. In each of the first apparatus 202 and the second apparatus 204, items are shown on two logical levels. The two levels are separated by a dashed line. Items on the first, highest level relate to data at a relatively high level of quality. Items on the second, lowest level relate to data at a relatively low level of quality. The relatively high and relatively low levels of quality relate to a tiered hierarchy having multiple levels of quality. In some examples, the tiered hierarchy comprises more than two levels of quality.

In such examples, the first apparatus 202 and the second apparatus 204 may include more than two different levels. There may be one or more other levels above and/or below those depicted in FIGS. 2A and 2B.

Referring first to FIG. 2A, the first apparatus 202 obtains a first representation of an image at a relatively high level of quality 206. A representation of a given image is a representation of data comprised in the image. The image may be a given frame of a video. The first representation of the image at the relatively high level of quality 206 will be referred to as "input data" hereinafter as, in this example, it is data provided as an input to the encoder in the first apparatus 202. The first apparatus 202 may receive the input data 206. For example, the first apparatus 202 may receive the input data 206 from at least one other apparatus. The first apparatus 202 may be configured to receive successive portions of input data 206, e.g. successive frames of a video, and to perform the operations described herein to each successive frame. For example, a video may comprise frames $F_1, F_2, \ldots F_T$ and the first apparatus 202 may process each of these in turn.

The first apparatus 202 derives data 212 based on the input data 206. In this example, the data 212 based on the input data 206 is a representation 212 of the image at the relatively low level of quality. In this example, the data 212 is derived by performing a downsampling operation on the input data 206 and will therefore be referred to as "downsampled data" hereinafter. In other examples, the data 212 is derived by performing an operation other than a downsampling operation on the input data 206.

In this example, the downsampled data 212 is processed to generate processed data 213 at the relatively low level of quality. In other examples, the downsampled data 212 is not processed at the relatively low level of quality. As such, the first apparatus 202 may generate data at the relatively low level of quality, where the data at the relatively low level of quality comprises the downsampled data 212 or the processed data 213.

In some examples, generating the processed data 213 involves encoding the downsampled data 212. Encoding the downsampled data 212 produces an encoded image at the relatively low level of quality. The first apparatus 202 may output the encoded image, for example for transmission to the second apparatus 204. A series of encoded images, e.g. forming an encoded video, as output for transmission to the second apparatus 204 may be referred to as a "base" stream. Instead of being produced in the first apparatus 202, the encoded image may be produced by an encoding device that is separate from the first apparatus 202. The encoded image may be part of an H.264 encoded video. Generating the processed data 213 may, for example, comprise generating successive frames of video as output by a separate encoding device such as an H.264 video encoder. An intermediate set of data for the generation of the processed data 213 may comprise the output of such an encoder, as opposed to any intermediate data generated by the separate encoding device.

Generating the processed data 213 at the relatively low level of quality may further involve decoding the encoded image at the relatively low level of quality. The decoding operation may be performed to emulate a decoding operation at the second apparatus 204, as will become apparent below. Decoding the encoded image produces a decoded image at the relatively low level of quality. In some examples, the first apparatus 202 decodes the encoded image at the relatively low level of quality to produce the decoded image at the relatively low level of quality. In other examples, the first apparatus 202 receives the decoded image at the relatively low level of quality, for example from an encoding and/or decoding device that is separate from the first apparatus 202. The encoded image may be decoded using an H.264 decoder. The decoding by a separate decoding device may comprise inputting encoded video, such as an encoded data stream configured for transmission to a remote decoding device, into a separate black-box decoder implemented together with the first apparatus 202 to generate successive decoded frames of video. Processed data 213 may thus comprise a frame of video data that is generated via a complex non-linear encoding and decoding process, where the encoding and decoding process may involve modelling spatio-temporal correlations as per a particular encoding standard such as H.264. However, because the output of any encoder is fed into a corresponding decoder, this complexity is effectively hidden from the first apparatus 202.

In an example, generating the processed data 213 at the relatively low level of quality further involves obtaining correction data based on a comparison between the downsampled data 212 and the decoded image obtained by the first apparatus 202, for example based on the difference between the downsampled data 212 and the decoded image. The correction data can be used to correct for errors introduced in encoding and decoding the downsampled data 212. In some examples, the first apparatus 202 outputs the correction data, for example for transmission to the second apparatus 204, as well as the encoded signal. This allows the recipient to correct for the errors introduced in encoding and decoding the downsampled data 212. This correction data may also be referred to as a "first enhancement" stream. As the correction data may be based on the difference between the downsampled data 212 and the decoded image it may be seen as a form of residual data (e.g. that is different from the other set of residual data described later below).

In some examples, generating the processed data 213 at the relatively low level of quality further involves correcting the decoded image using the correction data. For example, the correction data as output for transmission may be placed into a form suitable for combination with the decoded image, and then added to the decoded image. This may be performed on a frame-by-frame basis. In other examples, rather than correcting the decoded image using the correction data, the first apparatus 202 uses the downsampled data 212. For example, in certain cases, just the encoded then decoded data may be used and in other cases, encoding and decoding may be replaced by other processing.

In some examples, generating the processed data 213 involves performing one or more operations other than the encoding, decoding, obtaining and correcting acts described above.

The first apparatus 202 obtains data 214 based on the data at the relatively low level of quality. As indicated above, the data at the relatively low level of quality may comprise the processed data 213, or the downsampled data 212 where the downsampled data 212 is not processed at the lower level. As described above, in certain cases, the processed data 213 may comprise a reconstructed video stream (e.g. from an encoding-decoding operation) that is corrected using correction data. In the example of FIGS. 2A and 2B, the data 214 is a second representation of the image at the relatively high level of quality, the first representation of the image at the relatively high level of quality being the input data 206. The second representation at the relatively high level of quality may be considered to be a preliminary or predicted representation of the image at the relatively high level of quality. In this example, the first apparatus 202 derives the data 214 by performing an upsampling operation on the data at the relatively low level of quality. The data 214 will be referred to hereinafter as "upsampled data". However, in other examples one or more other operations could be used to derive the data 214, for example where data 212 is not derived by downsampling the input data 206. It should be noted that the references to relatively high and relatively low levels of quality may correspond to references to a first and second level of quality, where the second level of quality is higher than the first level of quality. As described herein, in certain cases, the levels of quality may correspond to different spatial resolutions.

The input data 206 and the upsampled data 214 are used to obtain residual data 216. The residual data 216 is associated with the image. The residual data 216 may be in the form of a set of residual elements. A residual element in the set of residual elements 216 may be associated with a respective image element in the input data 206. An example of an image element is a pixel.

In this example, a given residual element is obtained by subtracting a value of an image element in the upsampled data 214 from a value of a corresponding image element in the input data 206. As such, the residual data 216 is useable in combination with the upsampled data 214 to reconstruct the input data 206. The residual data 216 may also be referred to as "reconstruction data" or "enhancement data". In one case, the residual data 216 may form part of a "second enhancement" stream.

The first apparatus 202 obtains configuration data relating to processing of the residual data 216. The configuration data indicates how the residual data 216 has been processed and/or generated by the first apparatus 202 and/or how the residual data 216 is to be processed by the second apparatus 204. The configuration data may comprise a set of configuration parameters. The configuration data may be useable to control how the second apparatus 204 processes data and/or reconstructs the input data 206 using the residual data 216. The configuration data may relate to one or more characteristics of the residual data 216. The configuration data may relate to one or more characteristics of the input data 206. Different configuration data may result in different processing being performed on and/or using the residual data 216. The configuration data is therefore useable to reconstruct the input data 206 using the residual data 216. As described below, in certain cases, configuration data may also relate to the correction data described herein.

In this example, the first apparatus 202 transmits to the second apparatus 204 data based on the downsampled data 212, data based on the residual data 216, and the configuration data, to enable the second apparatus 204 to reconstruct the input data 206.

Turning now to FIG. 2B, the second apparatus 204 receives data 220 based on (e.g. derived from) the downsampled data 212. The second apparatus 204 also receives data based on the residual data 216. For example, the second apparatus 204 may receive a "base" stream (data 220), a "first enhancement stream" (any correction data) and a "second enhancement stream" (residual data 216). The second apparatus 204 also receives the configuration data relating to processing of the residual data 216. The data 220 based on the downsampled data 212 may be the downsampled data 212 itself, the processed data 213, or data derived from the downsampled data 212 or the processed data 213. The data based on the residual data 216 may be the residual data 216 itself, or data derived from the residual data 216.

In some examples, the received data 220 comprises the processed data 213, which may comprise the encoded image at the relatively low level of quality and/or the correction data. In some examples, for example where the first apparatus 202 has processed the downsampled data 212 to generate the processed data 213, the second apparatus 204 processes the received data 220 to generate processed data 222. Such processing by the second apparatus 204 may comprise decoding an encoded image (e.g. that forms part of a "base" encoded video stream) to produce a decoded image at the relatively low level of quality. In some examples, the processing by the second apparatus 204 comprises correcting the decoded image using obtained correction data. Hence, the processed data 222 may comprise a frame of corrected data at a first or relatively low level of quality. In some examples, the encoded image at the relatively low level of quality is decoded by a decoding device that is separate from the second apparatus 204. The encoded image at the relatively low level of quality may be decoded using an H.264 decoder.

In other examples, the received data 220 comprises the downsampled data 212 and does not comprise the processed data 213. In some such examples, the second apparatus 204 does not process the received data 220 to generate processed data 222.

The second apparatus 204 uses data at the relatively low level of quality to derive the upsampled data 214. As indicated above, the data at the relatively low level of quality may comprise the processed data 222, or the received data 220 where the second apparatus 204 does not process the received data 220 at the relatively low level of quality. The upsampled data 214 is a preliminary representation of the image at the relatively high level of quality. The upsampled data 214 may be derived by performing an upsampling operation on the data at the relatively low level of quality.

The second apparatus 204 obtains the residual data 216. The residual data 216 is useable with the upsampled data 214 to reconstruct the input data 206. The residual data 216 is indicative of a comparison between the input data 206 and the upsampled data 214.

The second apparatus 204 also obtains the configuration data related to processing of the residual data 216. The configuration data is useable by the second apparatus 204 to reconstruct the input data 206. For example, the configuration data may indicate a characteristic or property relating to the residual data 216 that affects how the residual data 216 is to be used and/or processed, or whether the residual data 216 is to be used at all. In some examples, the configuration data comprises the residual data 216.

There are several considerations relating to the use of such configuration data. One such consideration is the amount of information that is generated, stored, transmitted and/or processed. The more information that is used, the greater the amount of resources that may be involved in handling such information. Examples of such resources include transmission resources, storage resources and processing resources. Compared to some known techniques, examples described herein allow a relatively small amount of information to be used. This may reduce the amount of data transmitted via the data communications network 106. The savings may be particularly relevant where the data relates to high quality video data, where the amount of information transmitted in known systems can be especially high.

Other considerations include the ability of the decoder to perform image reconstruction accurately and reliably. Performing image reconstruction accurately and reliably may affect the ultimate visual quality of the displayed image and consequently may affect a viewer's engagement with the image and/or with a video comprising the image. One factor that may influence the accuracy and/or the reliability with which the decoder can perform reconstruction is in providing the decoder with up-to-date and/or accurate information relating to how reconstruction is to be performed. For example, configuration data may change over time and/or change between different images (e.g. different frames of video). If the decoder is not informed of such changes promptly, the resulting visual quality of reconstructed images may be affected. Compared to some known techniques, examples described herein allow configuration information to be signaled relatively frequently to the decoder, thereby enabling the decoder to use relatively up-to-date configuration information in image reconstruction.

Figure 3:
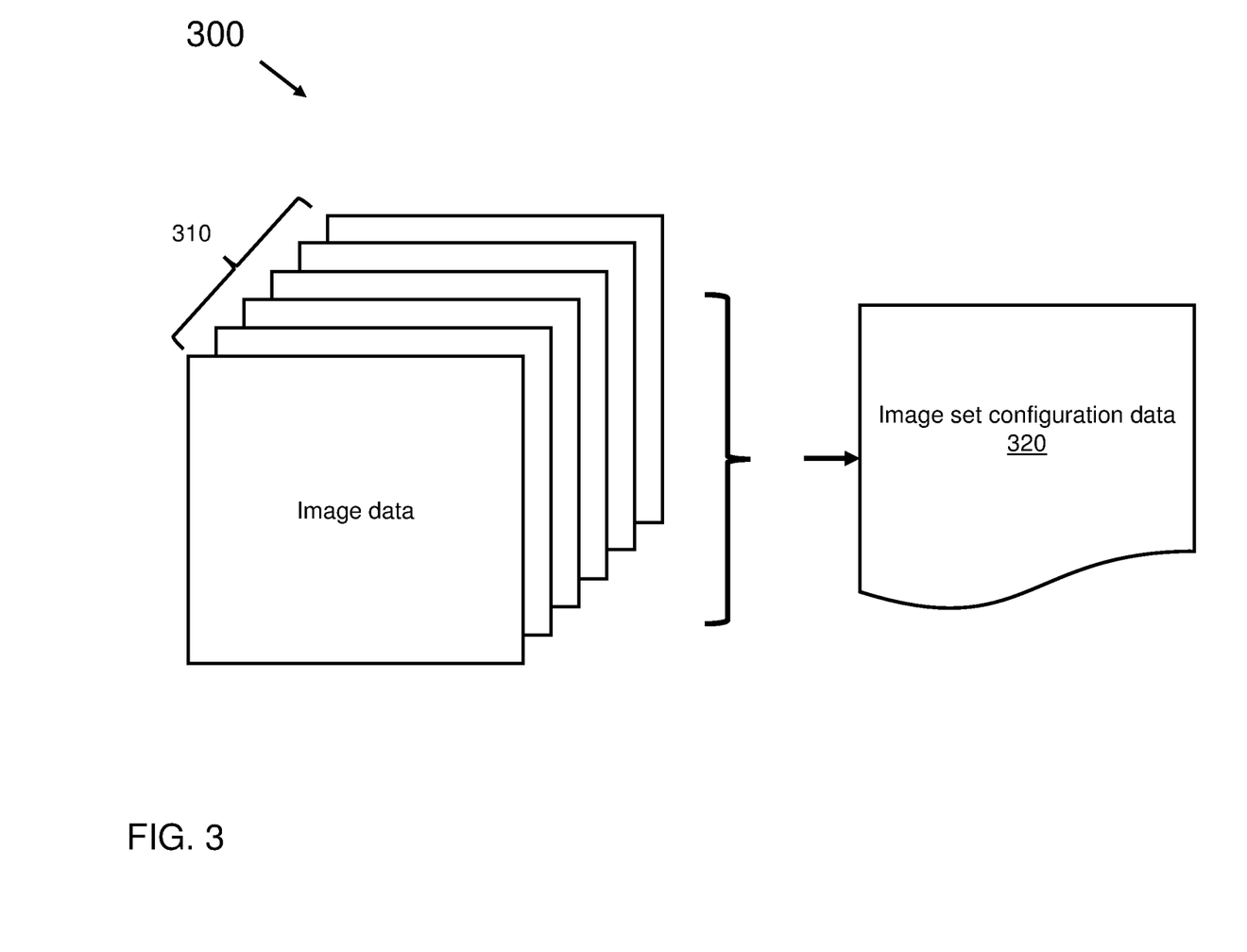
FIG. 3 shows a schematic diagram of an example of a data processing technique in accordance with an embodiment of the present invention.

Referring to FIG. 3, there is shown a data processing technique 300. The data processing technique 300 may be performed by an apparatus comprising an encoder such as the first apparatus 102 described above.

The data processing technique 300 involves a set of images 310. Although the set of images 310 depicted in FIG. 3 comprises 6 images, in other examples other numbers of images may be comprised in the set of images 310. In some examples, the set of images 310 comprises 75 images. The set of images 310 may be part of a video signal. For example, the set of images 310 may comprise consecutive frames of a video. The video may be a streamed video. An example of a video is a broadcast video. For example, the video may be broadcast via the data communications network 106. In some examples, the set of images 310 is encoded as a group of pictures (GOP). A GOP is an encoding of a sequence of images each of which may be decoded using information contained entirely within the GOP. A video may comprise multiple such GOPs.

For each image in the set of images 310, residual data is obtained. The residual data is based on a first representation of the image at a relatively high level of quality in a tiered hierarchy having multiple levels of quality and a second representation of the image at the relatively high level of quality. As explained with reference to FIGS. 2A and 2B above, the residual data for each image may be independent of residual data for other images in the set of images 310. The second representation is based on a representation of the image at a relatively low level of quality in the tiered hierarchy. The residual data is useable by a decoder to reconstruct, for each image in the set of images 310, the first representation using the second representation. For a given image in the set of images 310, the first representation may be input data 206, the representation at the relatively low level of quality may be downsampled data 212, the second representation may be upsampled data 214, and the residual data may be residual data 216, as described with reference to FIG. 2 above.

The residual data may be output to a decoder to enable the decoder to reconstruct, for each image in the set of images 310, the first representation using the second representation.

One or more configuration parameters 320 of configuration data are obtained. The configuration data is related to processing of the residual data. The configuration data may be indicative of how the residual data is to be processed by the decoder. The one or more configuration parameters 320 of the configuration data are useable by the decoder to reconstruct the first representation for each image in the set of images 310. The one or more configuration parameters 320 may be referred to herein as "image set configuration data".

In some examples, the one or more configuration parameters 320 comprises a configuration parameter relating to a transformation operation performed on the residual data. The transformation operation may be a directional decomposition operation. One example of a directional decomposition operation is a Hadamard transform. The transformation operation may exploit spatial and/or directional correlation between residual elements in the residual data. Performing the transformation operation on the residual data results in transformed residual data. The transformed residual data may be smaller than the residual data. The transformed residual data may have a lower encoding entropy than the residual data. As such, it may be more efficient for an encoder to transmit the transformed residual data than the residual data. For example, transforming the residual data may allow it to be more efficiently quantized and encoded. The decoder, receiving the transformed residual data, may then perform an inverse transformation operation on the transformed residual data to obtain the residual data. The encoder thus signals to the decoder which transformation operation has been applied to the residual data via the configuration parameter of the one or more configuration parameters 320. In some examples, the configuration parameter relating to the transformation operation specifies a transformation operation from a plurality of possible transformation operations that may be applied to the residual data.

In some examples, the one or more configuration parameters 320 comprises a configuration parameter relating to an upsampling operation. The upsampling operation is performed, for each image in the set of images 310, on the representation of the image at the relatively low level of quality. The upsampling operation is performed on the representation at the relatively low level of quality to derive the second representation of the image at the relatively high level of quality. The encoder performs such an upsampling operation in order to derive the residual data. The decoder may perform a corresponding upsampling operation in order to reconstruct the first representation, namely by combining the second representation with the residual data. The encoder thus signals to the decoder which upsampling operation is to be used via the configuration parameter of the one or more configuration parameters. In some examples, the configuration parameter relating to the upsampling operation specifies an interpolation operation from a plurality of possible interpolation operations. Examples of possible interpolation operations include nearest neighbour interpolation, bilinear interpolation, bicubic interpolation and Lanczos interpolation. In some examples, the configuration parameter relating to the upsampling operation specifies whether upsampling is performed in one dimension or two dimensions. In other words, the configuration parameter relating to the upsampling operation may specify whether one or both of horizontal and vertical upsampling is performed on the representation at the relatively low level of quality. In some examples, the configuration parameter relating to the upsampling operation may specify whether horizontal or both of horizontal and vertical upsampling is performed on the representation at the relatively low level of quality.

In some examples, the one or more configuration parameters 320 comprises a configuration parameter relating to a bit depth. The bit depth is associated with the residual data for a given image in the set of images 310. The bit depth may also be referred to as a colour depth. In some examples, the configuration parameter relating to the bit depth indicates the number of bits used to indicate the colour of a given pixel in a given image. As such, the bit depth may be indicative of how finely colour can be represented in the given image. In some examples, the bit depth indicates the number of bits used for each colour component of a given pixel in a given image. In some examples, a given residual element in the residual data for a given image comprises a plurality of colour components. The bit depth may indicate the number of bits used for each colour component of the given residual element, for example the number of bits per each YUV or RGB component. In certain cases, the colour components may have different bit depths.

In some examples, the one or more configuration parameters 320 comprises a configuration parameter specifying a resolution of the first representation of a given image in the set of images 310.

The one or more configuration parameters 320 correspond to multiple images in the set of images 310. In this example, the one or more configuration parameters 320 comprises image set configuration data corresponding to all of the images in the set of images 310. As such, a single set of image set configuration data is applicable to every image in the set of images 310. Image set configuration data may be referred to as "global configuration data".

The one or more configuration parameters 320 are output to the decoder to enable the decoder to reconstruct, for each image in the set of images 310, the first representation using the second representation and the residual data.

The number of times the one or more configuration parameters 320 is output for the set of images 310 is less than the number of images in the set of images 310. Outputting the one or more configuration parameters 320 for a number of images that is less than the number of images in the set of images 310 reduces the amount of information that is transmitted over a given period of time. In this example, the number of times the one or more configuration parameters 320 is output for the set of images 310 is one. The one or more configuration parameters 320 may be output for the first image only in the set of images 310. The first image in the set of images 310 may be the first image in the set of images 310 that is output, received, processed and/or displayed. Outputting the one or more configuration parameters 320 for the first image in the set of images 310 may enable the recipient to receive the one or more configuration parameters 320 as early as possible, and/or may enable the recipient to apply the one or more configuration parameters 320 to as many images in the set of images 310 as possible. In some examples, the one or more configuration parameters 320 is output with or alongside the first image in the set of images 310. The one or more configuration parameters 320 may be output in the form of metadata. In some examples, the one or more configuration parameters 320 are output for an image other than the first image in the set of images 310. In some examples, the number of times the one or more configuration parameters 320 is output for the set of images 310 is greater than one but less than the number of images in the set of images 310. In one example, the one or more configuration parameters 320 is output once for a set of images comprising 75 images.

In some examples, the number of times the one or more configuration parameters 320 is output for the set of images 310 is based on an optimization metric. An example of an optimization metric is a rate-distortion metric. Rate-distortion optimization optimizes the amount of data that is transmitted against an amount of loss of visual quality. The more infrequently the one or more configuration parameters 320 is output, the less data is transmitted. However, outputting the one or more configuration parameters 320 too infrequently may result in an undesirable loss of quality due to the decoder 110 not being provided with up-to-date configuration data. Therefore, the number of times the one or more configuration parameters 320 is output is optimized so as to reduce the amount of data sent whilst reducing any loss in visual quality.

In some examples, a ratio of the number of times the one or more configuration parameters 320 is output for the set of images 310 to the number of images in the set of images 310 is less than a predetermined threshold value. The predetermined threshold value may be based on an optimization metric. An example of an optimization metric is the rate-distortion metric described above. In one illustrative example, it may be determined that the ratio of the number of times the one or more configuration parameters 320 is output for the set of images 310 to the number of images in the set of images 310 is to be less than 1:10. That is, it may be determined that the one or more configuration parameters 320 is to be output once for every ten or more images.

In some examples, the one or more configuration parameters 320 is arranged into an integer number of bytes. In some examples, the one or more configuration parameters 320 is three bytes long. In other examples, the one or more configuration parameters 320 is seven bytes long.

In some examples, byte-wise processing is performed on the one or more configuration parameters 320. In byte-wise processing, one or more configuration parameters 320 is processed on a byte-by-byte basis. Processing configuration data in a byte-wise manner may be more efficient than processing the configuration data in a bit-wise manner. Bit-wise processing may involve tracking which bit within a given byte is the next bit to be read or written. When a group of bits that represents a given parameter straddles a byte boundary, additional processing may be performed in order to read the group of bits and obtain the given parameter. Such processing may be reduced in a case where byte-wise processing is performed. In some examples, a number of execution cycles may be reduced when processing data in a byte-wise manner compared to a bit-wise manner.

In some examples, the configuration data is written to memory. Less processing may be involved in storing the configuration data in memory and/or in retrieving the configuration data from memory if the configuration data is handled in a byte-by-byte manner compared to a case in which the configuration data is handled in a bit-by-bit manner. The smallest unit of addressable memory may comprise one byte. As such, information may be stored in memory in a byte-wise manner. Therefore, fewer steps may be involved in storing the configuration data in memory and/or in retrieving the configuration data from memory if the configuration data is packaged into a sequence of bytes. An amount of padding used to package the configuration data into addressable memory units may also be reduced by providing the configuration data to the memory in a byte-wise form.

Furthermore, transmission of the configuration data via a network such as the Internet may be performed more efficiently if the configuration data is arranged into a sequence of bytes. Data may be transmitted over the Internet via the Transmission Control Protocol (TCP). TCP operates in a transport layer of a protocol stack. TCP obtains data from a stream, packages the data into TCP segments and uses an internet module, for example the Internet Protocol (IP), to transmit each TCP segment to a recipient via the Internet. The data stream may be obtained from memory. A TCP segment may comprise an integer number of bytes. As such, less processing may be involved if the TCP obtains the data that is to be packaged into the TCP segments from a byte-wise stream than from a bit-wise stream. An amount of padding used to package the data into TCP segments may also be reduced by providing the data to the TCP in a byte-wise form.

Figure 4:
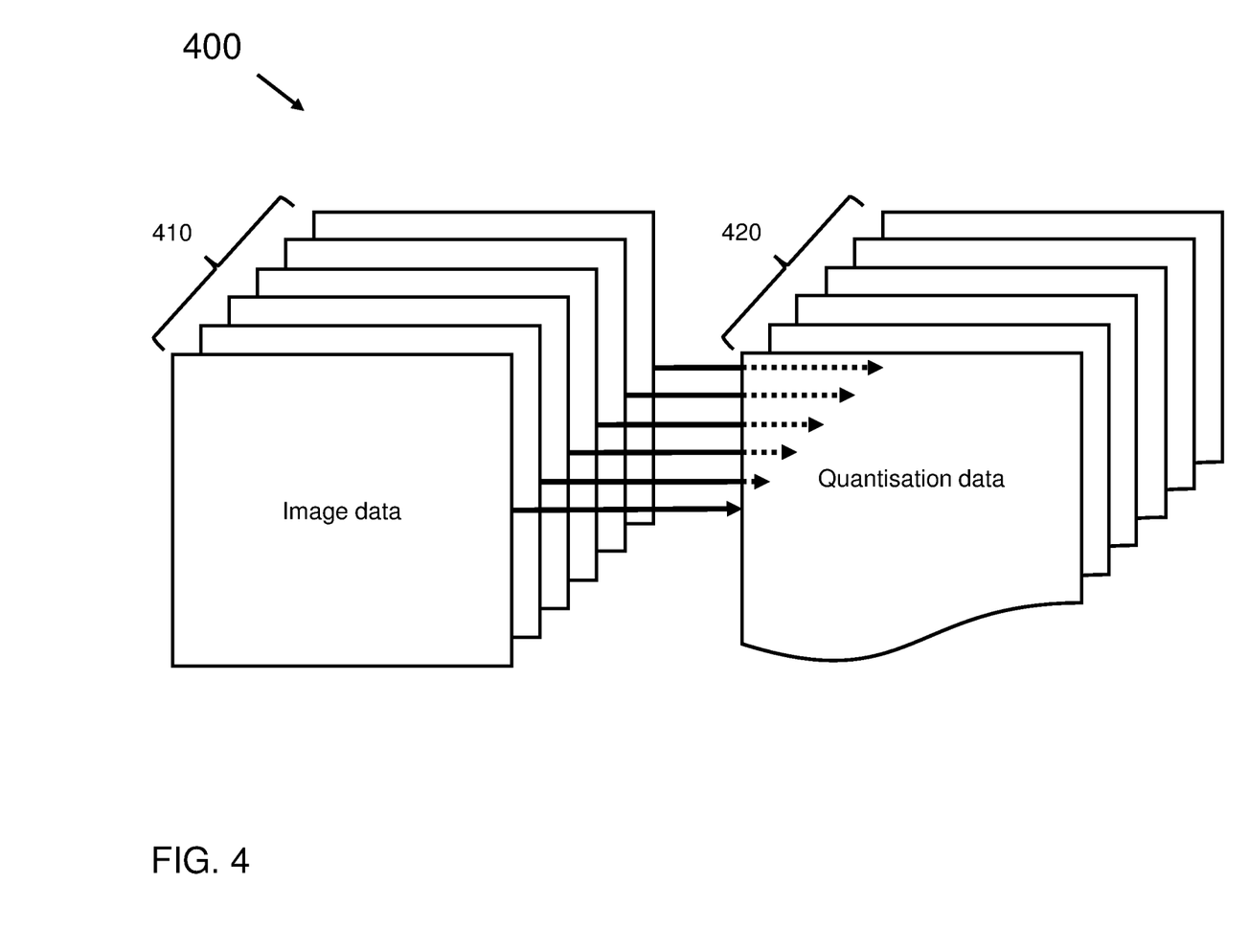
FIG. 4 shows a schematic diagram of another example of a data processing technique in accordance with an embodiment of the present invention.

Referring to FIG. 4, there is shown a data processing technique 400. The data processing technique 400 may be performed by an apparatus comprising an encoder such as the first apparatus 102 described above. Some items depicted in FIG. 4 are similar to items shown in FIG. 3. Corresponding reference signs, incremented by 100, have therefore been used for similar items.

The data processing technique 400 involves a set of images 410. These may be frames of a video signal.

For each image in the set of images 410, quantisation data 420 is obtained. The quantisation data 420 is indicative of a quantisation level of data useable by a decoder to reconstruct a first representation of the image at the relatively high level of quality using a second representation of the image at the relatively high level of quality. The second representation is based on a representation of the image at the relatively low level of quality. For a given image in the set of images 410, the first representation may be input data 206, the representation at the relatively low level of quality may be down-sampled data 212, and the second representation may be upsampled data 214, as described above.

Quantisation involves approximating a relatively large set of values by a relatively small set of values, for example by rounding, thresholding or truncating the values in the relatively large set. The objective of a quantisation operation is to reduce the amount of data in quantised output data compared to that in the input data to the quantisation operation. A quantisation level of given data may indicate how aggressively the given data is quantised. A quantisation level may be indicative of a granularity of quantised data obtained via the quantisation process. In another words, the quantisation level may be indicative of how much information is lost due to such quantisation.

In some examples, the quantisation data 420 is indicative of a quantisation level of residual data. For a given image in the set of images 410, the residual data is based on the first representation of the image and the second representation of the image, as described with reference to FIG. 2 above. Therefore, the data useable by the decoder to reconstruct the first representation may be data at the relatively high level of quality. The quantisation level may instruct the decoder 110 on how to perform an inverse quantisation upon already quantised residual data 216. For example, at the decoder 110, a received set of residual data 216 may have values in a first quantised range, that are then expanded to a larger range of values following inverse quantisation. The quantisation data 852 may be used to perform this operation.

In some examples, the quantisation data 420 is indicative of a quantisation level of correction data. For a given image in the set of images 410, the correction data is useable to correct for errors in encoding and/or decoding the representation at the relatively low level of quality, as described with reference to FIG. 2 above. Therefore, the data useable by the decoder to reconstruct the first representation may be data at the relatively low level of quality. Inverse quantisation may be performed in a similar manner for the correction data, but in certain cases may be based on a different portion of the quantisation data 420.

In some examples, the quantisation data 420 is indicative of a first quantisation level and a second quantisation level. The first quantisation level is a quantisation level applied to residual data. The second quantisation level is a quantisation level applied to correction data. As such, both residual data and correction data may be quantised using individually defined quantisation levels that are indicated by the quantisation data 420. The quantisation data 420 may thus comprise levels at which one or more of correction data and residual data were quantised at an encoder (e.g. following transformation as described herein), which are then sent to a decoder to allow inverse quantisation and reconstruction of original values associated with the correction data and residual data (the reconstructed values may not match the original values prior to quantisation at the encoder, due to information lost during the quantisation process).

The quantisation data 420 may comprise an integer number of bytes. In some examples, the quantisation data 420 comprises two bytes. In some examples, the quantisation data 420 comprises four bytes.

The quantisation data 420 is output for processing by the decoder. The quantisation data 420 enables the decoder to reconstruct, for each image in the set of images 410, the first representation of the image using the second representation of the image.

The quantisation data 420 is output for a plurality of images in the set of images 410. In some examples, the number of images in the plurality of images is equal to the number of images in the set of images 410. In other words, the quantisation data 420 may be output for every image in the set of images 410. The quantisation data 420 may be output with or alongside every image in the set of images 410. In other examples, the number of images in the plurality of images is less than the number of images in the set of images 410. The number of images in the plurality of images may be based on an optimization metric. The optimization metric may be a rate-distortion metric.

In some examples, in addition to the quantisation data 420, the one or more set of configuration parameters 320 as described with reference to FIG. 3 is output for the set of images 410. The number of times the one or more configuration parameters 320 is output for the set of images 410 is less than the number of times the quantisation data 420 is output for the set of images 410. For example, the one or more configuration parameters 320 may be output only once for the set of images 410, and the quantisation data 420 may be output for every image in the set of images 410. As such, the quantisation data 420 is output more frequently than the one or more configuration parameters 320.

The quantisation data 420 may be comprised in image configuration data. Image configuration data corresponds to a particular image in a set of images. This is in contrast to image set configuration data which corresponds to the set of images as a whole.

The image configuration data may comprise one or more configuration parameters in addition to the quantisation data 420. The one or more configuration parameters in the image configuration data for a given image may comprise a configuration parameter that specifies whether the given image is interlaced or progressive.

Outputting the quantisation data 420 relatively frequently uses more data than outputting the quantisation data 420 relatively infrequently. However, outputting the quantisation data 420 relatively frequently provides the decoder with up-to-date information that enables the decoder to perform image reconstruction with a high degree of accuracy and/or reliability. The quantisation data 420 may change between different images, for example. There is thus a trade-off between an amount of data that is sent to the decoder and an accuracy and/or reliability with which the decoder can perform reconstruction using the data that is received. For the one or more configuration parameters 320 and the quantisation data 420, the optimal outcome of such a trade-off may be that the quantisation data 420 is sent more frequently than the one or more configuration parameters 320. Sending the one or more configuration parameters 320 with a relatively low frequency and sending the quantisation data 420 with a relatively high frequency may therefore reduce an amount of information that is sent over a given period of time whilst enabling the decoder to perform reconstruction with a predetermined level of accuracy and/or a reliability.

Figure 5:
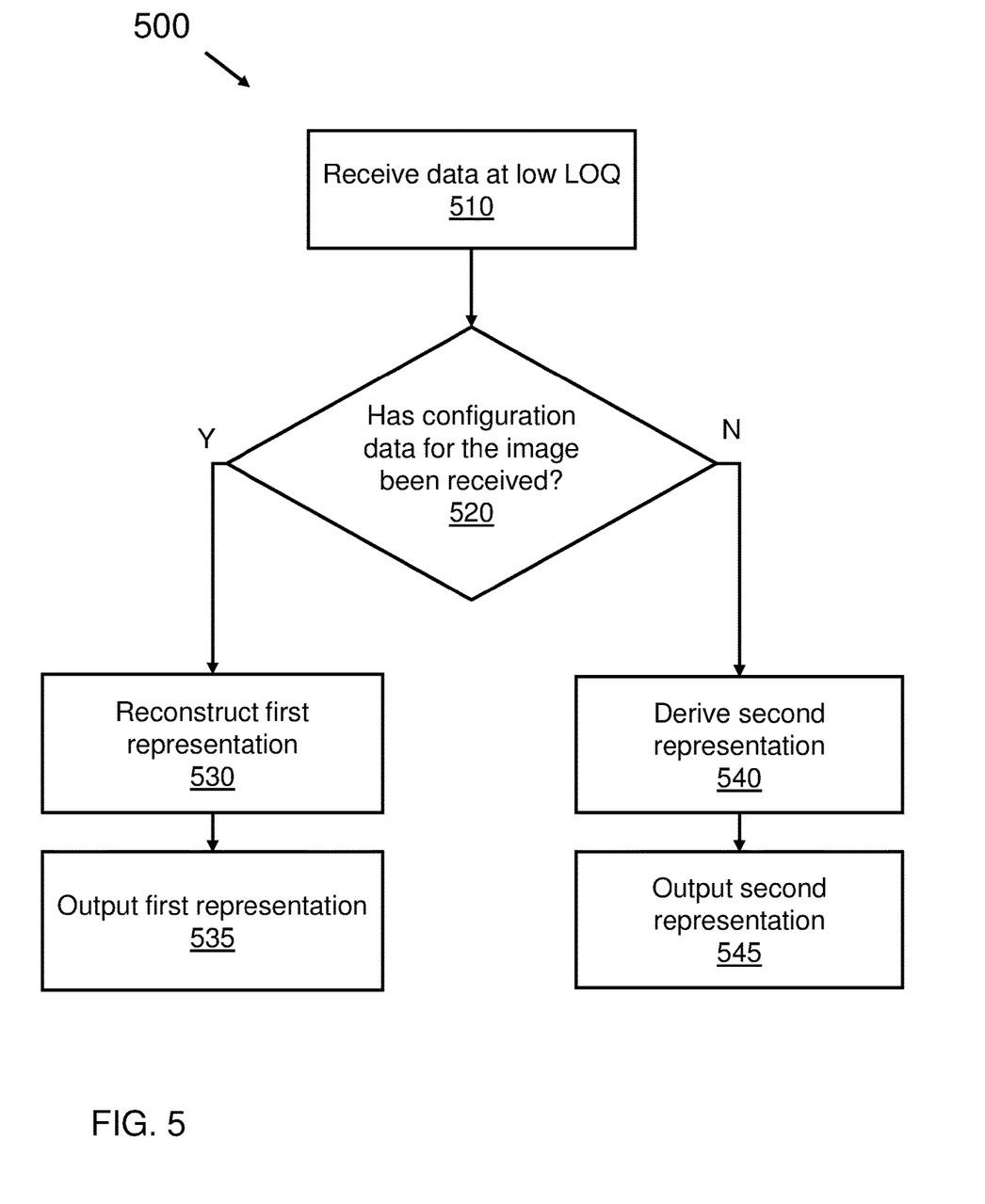
FIG. 5 shows a flow diagram depicting an example of a method in accordance with an embodiment of the present invention.

Referring to FIG. 5, there is shown an example of a method 500 for use in processing representations of an image. The method 500 may be performed by an apparatus comprising a decoder such as the second apparatus 104 described above.

At item 510, data is received that is useable to derive a representation of an image at a relatively low level of quality in a tiered hierarchy comprising multiple levels of quality. The received data may be data 220 as described above. The received data may be encoded data. Prior to receipt by the decoder, the representation at the relatively low level of quality is derived by an encoder, for example encoder 108, using a first representation of the image at a relatively high level of quality in the tiered hierarchy. The first representation may be input data 206 as described above. In some examples, the image is one of a set of images. The set of images may be part of a video signal. In some examples, the received data is processed to obtain the representation at the relatively low level of quality. For example, the received data may be decoded to obtain the representation at the relatively low level of quality.

At item 520, it is determined whether predetermined configuration data has been received. The predetermined configuration data corresponds to the image.

If it is determined at item 520 that the predetermined configuration data corresponding to the image has been received, the first representation 206 of the image is reconstructed at item 530. The first representation is reconstructed using the predetermined configuration data. The first representation is reconstructed using a second representation of the image at the relatively high level of quality. In some examples, the representation at the relatively low level of quality is processed to derive the second representation. For example, the second representation may be derived by upsampling the representation at the relatively low level of quality. The first representation may be reconstructed by combining the second representation with the residual data.

At item 535, the first representation is output. For example, the first representation may be output for display by a display device.

If it is determined at item 520 that the predetermined configuration data corresponding to the image has not been received, the first representation of the image is not reconstructed. Instead, the representation of the image at the relatively low level of quality is processed at item 540 to derive the second representation. The second representation may be derived by upsampling the representation at the relatively low level of quality.

At item 545, the second representation is output. For example, the second representation may be output for display by the display device.

In some examples, if it is determined that the predetermined configuration data corresponding to the image has not been received, the second representation of the image is not derived. In some examples, the representation at the relatively low level of quality is output instead of the second representation. In some examples, data based on the representation at the relatively low level of quality is output. The data based on the representation at the relatively low level of quality is different from the first representation and the second representation.

In a case where the image is one of a set of images, the predetermined configuration data may correspond to multiple images in the set of images. The predetermined configuration data may not be received with every image in the set of images. In one example, the predetermined configuration data is received with the first image only in the set of images. The predetermined configuration data may be applicable to every subsequent image in the set of images. As such, if the first image in the set of images is not received by the decoder, the predetermined configuration data for the set of images may also not have been received. The predetermined configuration data may be image set configuration data. In some examples, the predetermined configuration data comprises the one or more configuration parameters 320 described above. The predetermined configuration data may be configuration data that is applicable to every image in the set of images.

In a case where the set of images are part of a streamed video, the decoder may enter the video stream partway through the set of images. In such a case, although the first representation is not reconstructed due to the absence of receipt of the predetermined configuration data, a representation at the relatively high level of quality is still output, namely the second representation. Outputting the second representation for display reduces a potential loss in visual quality caused by the absence of receipt of the predetermined configuration data compared to a case in which a representation at the relatively high level of quality is not output. Outputting the second representation may be considered part of a "minimum operation mode", in contrast to outputting the first representation, which may be considered part of a "full operation mode". In the case where the decoder enters the stream partway through the set of images, the "minimum operation mode" may be used for the remainder of the set of images. When the first image in a following set of images is then received, the predetermined configuration data for the following set of images is also received. As such, the following set of images may be processed according to the "full operation mode".

Figure 6:
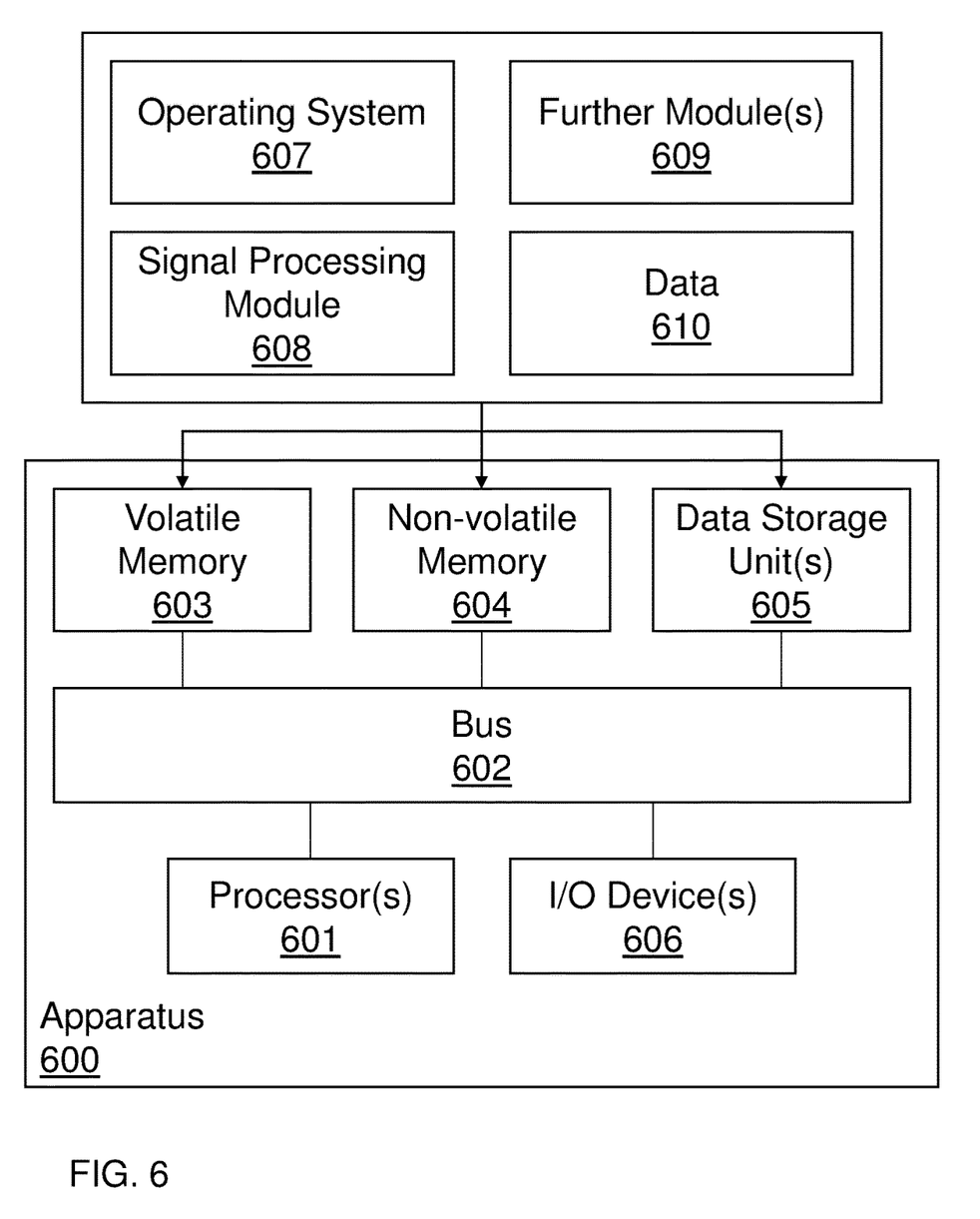
FIG. 6 shows a schematic block diagram of an example of an apparatus in accordance with an embodiment of the present invention.

Referring to FIG. 6, there is shown a schematic block diagram of an example of an apparatus 600.

In an example, the apparatus 600 comprises an encoder. In another example, the apparatus 600 comprises a decoder.

Examples of apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 600 comprises one or more processors 601 configured to process information and/or instructions. The one or more processors 601 may comprise a central processing unit (CPU). The one or more processors 601 are coupled with a bus 602. Operations performed by the one or more processors 601 may be carried out by hardware and/or software. The one or more processors 601 may comprise multiple co-located processors or multiple disparately located processors.

In this example, the apparatus 600 comprises computer-useable volatile memory 603 configured to store information and/or instructions for the one or more processors 601. The computer-useable volatile memory 603 is coupled with the bus 602. The computer-useable volatile memory 603 may comprise random access memory (RAM).

In this example, the apparatus 600 comprises computer-useable non-volatile memory 604 configured to store information and/or instructions for the one or more processors 601. The computer-useable non-volatile memory 604 is coupled with the bus 602. The computer-useable non-volatile memory 604 may comprise read-only memory (ROM).

In this example, the apparatus 600 comprises one or more data-storage units 605 configured to store information and/or instructions. The one or more data-storage units 605 are coupled with the bus 602. The one or more data-storage units 605 may for example comprise a magnetic or optical disk and disk drive or a solid-state drive (SSD).

In this example, the apparatus 600 comprises one or more input/output (I/O) devices 606 configured to communicate information to and/or from the one or more processors 601. The one or more I/O devices 606 are coupled with the bus 602. The one or more I/O devices 606 may comprise at least one network interface. The at least one network interface may enable the apparatus 600 to communicate via one or more data communications networks. Examples of data communications networks include, but are not limited to, the Internet and a Local Area Network (LAN). The one or more I/O devices 606 may enable a user to provide input to the apparatus 600 via one or more input devices (not shown). The one or more input devices may include for example a remote control, one or more physical buttons etc. The one or more I/O devices 606 may enable information to be provided to a user via one or more output devices (not shown). The one or more output devices may for example include a display screen.

Various other entities are depicted for the apparatus 600. For example, when present, an operating system 607, data signal processing module 608, one or more further modules 609, and data 610 are shown as residing in one, or a combination, of the computer-usable volatile memory 603, computer-usable non-volatile memory 604 and the one or more data-storage units 605. The data signal processing module 608 may be implemented by way of computer program code stored in memory locations within the computer-usable non-volatile memory 604, computer-readable storage media within the one or more data-storage units 605 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a data signal processing module 608 which can be executed by the one or more processors 601. The data signal processing module 608 can be configured to include instructions to implement at least some of the operations described herein. During operation, the one or more processors 601 launch, run, execute, interpret or otherwise perform the instructions in the signal processing module 608.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 600 may comprise more, fewer and/or different components from those depicted in FIG. 6.

The apparatus 600 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of processing configuration data, the method comprising:
    obtaining, for each image in a set of images, residual data based on a first representation of said each image at a first level of quality in a tiered hierarchy having multiple levels of quality and a second representation of said each image at the first level of quality, the second representation being based on a representation of said each image at a second, lower level of quality in the tiered hierarchy, the residual data being useable by a decoder to reconstruct, for said each image, the first representation using the second representation;
    obtaining one or more configuration parameters of configuration data relating to processing of the residual data, the one or more configuration parameters being useable by the decoder to reconstruct the first representation for each image in the set of images, the one or more configuration parameters corresponding to multiple images in the set of images; and
    outputting the one or more configuration parameters for processing by the decoder to enable the decoder to reconstruct, for each image in the set of images, the first representation using the second representation and the residual data, wherein:
        a number of times the one or more configuration parameters is output for the set of images is less than a number of images in the set of images; and
        the number of times the one or more configuration parameters is output is based on a rate-distortion optimization metric that optimizes an amount of data that is transmitted against an amount of loss of visual quality that potentially occurs when the decoder is not provided with up-to-date configuration data.

2. The method of claim 1, wherein the number of times the one or more configuration parameters is output for the set of images is one.

3. The method of claim 1, wherein the one or more configuration parameters is output for a first image only in the set of images.

4. The method of claim 1, wherein the one or more configuration parameters comprises image set configuration data corresponding to all of the images in the set of images.

5. The method of claim 1, the method comprising performing byte-wise processing of the one or more configuration parameters.

6. The method of claim 1, the method comprising arranging the one or more configuration parameters into an integer number of bytes.

7. The method of claim 1, wherein the one or more configuration parameters comprises a configuration parameter relating to a transformation operation performed on the residual data.

8. The method of claim 7, wherein the transformation operation comprises a directional decomposition operation performed on the residual data.

9. The method of claim 1, wherein the one or more configuration parameters comprises a configuration parameter relating to an upsampling operation performed, for each image in the set of images, on the representation of the image at the second level of quality.

10. The method of claim 1, wherein the one or more configuration parameters comprises a configuration parameter relating to a bit depth associated with the residual data.

11. The method of claim 1, wherein the one or more configuration parameters comprises a configuration parameter specifying a resolution of the first representation of the image.

12. A method of processing configuration data, the method comprising:
    receiving one or more configuration parameters of configuration data relating to processing of residual data, the residual data having been obtained, for each image in a set of images, based on a first representation of said each image at a first level of quality in a tiered hierarchy having multiple levels of quality and a second representation of said each image at the first level of quality, the second representation being based on a representation of said each image at a second, lower level of quality in the tiered hierarchy, the residual data being useable to reconstruct, for said each image, the first representation using the second representation, wherein the one or more configuration parameters correspond to multiple images in the set of images;
    processing the one or more configuration parameters to reconstruct, for each image in the set of images, the first representation using the second representation and the residual data, wherein:
        the number of times the one or more configuration parameters is received for the set of images is less than the number of images in the set of images, and
        the number of times the one or more configuration parameters is received is based on a rate-distortion optimization metric that optimizes an amount of data that is transmitted against an amount of loss of visual quality that potentially occurs when the decoder is not provided with up-to-date configuration data.

13. The method of claim 12, wherein the number of times the one or more configuration parameters is received for the set of images is one.

14. The method of claim 12, the method comprising receiving the one or more configuration parameters for a first image only in the set of images.

15. The method of claim 12, wherein the one or more configuration parameters comprises image set configuration data corresponding to all of the images in the set of images.

16. The method of claim 12, the method comprising receiving, for each image in the set of images, the representation of the image at the second level of quality.

17. An apparatus comprising:
one or more hardware processors; and
one or more hardware storage devices that store instructions that are executable by the one or more hardware processors to cause the apparatus to:
receive one or more configuration parameters of configuration data relating to processing of residual data, the residual data having been obtained, for each image in a set of images, based on a first representation of the image at a first level of quality in a tiered hierarchy having multiple levels of quality and a second representation of the image at the first level of quality, the second representation being based on a representation of the image at a second, lower level of quality in the tiered hierarchy, the residual data being useable to reconstruct, for each image in the set of images, the first representation using the second representation, wherein the one or more configuration parameters correspond to multiple images in the set of images;
process the one or more configuration parameters to reconstruct, for each image in the set of images, the first representation using the second representation and the residual data, wherein:
the number of times the one or more configuration parameters is received for the set of images is less than the number of images in the set of images and
the number of times the one or more configuration parameters is output is based on a rate-distortion optimization metric that optimizes an amount of data that is transmitted against an amount of loss of visual quality that potentially occurs when the decoder is not provided with up-to-date configuration data.

18. The apparatus of claim 17, wherein a ratio regarding the number of times the one or more configuration parameters is output to the number of images in the set of images is less than 1:10.

* * * * *